US00RE49739E

(19) United States
(12) Reissued Patent
Lee et al.

(10) Patent Number: US RE49,739 E
(45) Date of Reissued Patent: *Nov. 28, 2023

(54) METHOD FOR SIGNALING BACK-OFF INFORMATION IN RANDOM ACCESS

(71) Applicant: LG Electronics Inc., Seoul (KR)

(72) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: This patent is subject to a terminal disclaimer.

(21) Appl. No.: 17/214,041

(22) Filed: Mar. 26, 2021

Related U.S. Patent Documents

Reissue of:
(64) Patent No.: 8,040,913
Issued: Oct. 18, 2011
Appl. No.: 12/475,107
Filed: May 29, 2009

U.S. Applications:
(63) Continuation of application No. 15/826,172, filed on Nov. 29, 2017, now Pat. No. Re. 48,836, which is an
(Continued)

(30) Foreign Application Priority Data

Jan. 22, 2009 (KR) ..... 10-2009-0005439

(51) Int. Cl.
*H04L 12/413* (2006.01)
*H04W 74/00* (2009.01)
*H04W 74/08* (2009.01)

(52) U.S. Cl.
CPC ..... *H04W 74/002* (2013.01); *H04W 74/0833* (2013.01)

(58) Field of Classification Search
CPC ..... H04W 74/002; H04W 74/0833
See application file for complete search history.

(56) References Cited

U.S. PATENT DOCUMENTS 5,754,754 A 5/1998 Dudley et al.
5,802,064 A 9/1998 Lieberman
(Continued)

FOREIGN PATENT DOCUMENTS

CN 1349360 5/2002
CN 1437368 8/2003
(Continued)

OTHER PUBLICATIONS

"3GPP, ""Universal Mobile Telecommunications System (UMTS); Radio Resource Control (RRC) protocol specification (3GPP TS 25.331 version 6.6.0 Release 6),"" ETSI TS 125 331 V6.6.0, Jun. 2005, pp. 1-1156".
(Continued)

*Primary Examiner* — David E England
(74) *Attorney, Agent, or Firm* — Fish & Richardson P.C.

(57) ABSTRACT

A method for performing random access in a wireless communication system is provided. The method includes transmitting a preamble for random access in uplink, receiving a random access response message including back-off information as a response to the preamble, and performing back-off using the back-off information when the random access has failed.

24 Claims, 14 Drawing Sheets

Related U.S. Application Data application for the reissue of Pat. No. 8,040,913, which is a continuation of application No. 12/362,993, filed on Jan. 30, 2009, now Pat. No. 8,027,356.

(60) Provisional application No. 61/025,267, filed on Jan. 31, 2008.

(56) References Cited

U.S. PATENT DOCUMENTS 5,878,041 A 3/1999 Yamanaka et al.
6,557,135 B1 4/2003 Balachandran et al.
6,594,240 B1 7/2003 Chuah et al. ..... H04W 74/085 370/328
6,728,918 B1 4/2004 Ikeda et al.
6,738,624 B1 5/2004 Aksentijevic et al.
6,862,450 B2 3/2005 Mikola et al.
6,874,113 B2 3/2005 Chao et al.
6,967,936 B1 11/2005 Laroia et al.
6,987,985 B2 1/2006 Purkayastha et al.
7,009,940 B2 3/2006 Vialen et al.
7,180,885 B2 2/2007 Terry
7,227,857 B2 6/2007 Kuo
7,227,868 B2 6/2007 Inden
7,295,573 B2 11/2007 Yi et al.
7,464,166 B2 12/2008 Larsson et al.
7,486,699 B2 2/2009 Yi et al.
7,796,505 B2 9/2010 Olsson et al.
7,894,444 B2 2/2011 Lohr et al.
8,027,321 B2 9/2011 Zheng
8,027,356 B2 * 9/2011 Lee ..... H04W 74/002 370/445
8,040,913 B2 * 10/2011 Lee ..... H04W 74/0833 370/445
8,270,361 B2 9/2012 Yi et al.
8,335,189 B2 12/2012 Wang et al.
8,422,510 B2 * 4/2013 Lee ..... H04W 74/002 370/445
8,532,135 B2 * 9/2013 Lee ..... H04W 74/002 370/455
8,699,711 B2 4/2014 Mukherjee et al.
8,712,055 B2 4/2014 Yi et al.
8,797,956 B2 8/2014 Hapsari et al.
8,812,009 B2 8/2014 Chun et al.
8,989,382 B2 3/2015 Yi et al.
RE48,836 E * 11/2021 Lee ..... H04W 74/002
2002/0001314 A1 1/2002 Yi et al.
2002/0009999 A1 1/2002 Lee et al.
2002/0122411 A1 9/2002 Zimmerman et al.
2003/0007490 A1 1/2003 Yi et al.
2003/0099305 A1 5/2003 Yi et al.
2003/0137931 A1 7/2003 Hans et al.
2003/0194992 A1 10/2003 Kim et al.
2003/0220119 A1 11/2003 Terry
2004/0003106 A1 1/2004 Cunningham et al.
2004/0022213 A1 2/2004 Choi et al.
2004/0076182 A1 4/2004 Wu
2004/0085932 A1 5/2004 Jiang
2004/0103435 A1 5/2004 Yi et al.
2004/0146019 A1 7/2004 Kim et al. ..... H04W 74/002 370/341
2004/0147236 A1 7/2004 Parkvall et al.
2004/0156330 A1 8/2004 Yi et al.
2004/0235447 A1 11/2004 Gronberg et al.
2005/0020260 A1 1/2005 Jeong et al.
2005/0047416 A1 3/2005 Heo et al.
2005/0054365 A1 3/2005 Ahn et al.
2005/0063347 A1 3/2005 Sarkkinen et al.
2005/0094596 A1 5/2005 Pietraski et al.
2005/0096017 A1 5/2005 Kim
2005/0118992 A1 6/2005 Jeong et al.
2005/0169293 A1 8/2005 Zhang et al.
2005/0213605 A1 9/2005 Kim et al.
2005/0237972 A1 10/2005 Van Dervelde et al.
2005/0250526 A1 11/2005 Lindoff et al.
2005/0254467 A1 11/2005 Li et al.
2005/0259662 A1 11/2005 Kim et al.
2005/0287957 A1 12/2005 Lee et al.
2006/0067238 A1 3/2006 Olsson et al.
2006/0067289 A1 3/2006 Lee et al.
2006/0072494 A1 4/2006 Matusz
2006/0072503 A1 4/2006 Kim et al.
2006/0084389 A1 4/2006 Beale et al.
2006/0154680 A1 7/2006 Kroth et al.
2006/0164981 A1 7/2006 Olsson et al.
2006/0165045 A1 7/2006 Kim et al.
2006/0182065 A1 8/2006 Petrovic et al.
2006/0203780 A1 9/2006 Terry
2006/0233200 A1 10/2006 Fifield et al.
2006/0251027 A1 11/2006 Chun et al.
2006/0251105 A1 11/2006 Kim et al.
2006/0268798 A1 11/2006 Kim et al.
2006/0280145 A1 12/2006 Revel et al.
2007/0032255 A1 2/2007 Koo et al.
2007/0041397 A1 2/2007 Hwang
2007/0047493 A1 3/2007 Park et al.
2007/0060139 A1 3/2007 Kim et al.
2007/0079207 A1 4/2007 Seidel et al.
2007/0081468 A1 4/2007 Timus
2007/0081513 A1 4/2007 Torsner
2007/0091810 A1 4/2007 Kim et al.
2007/0133456 A1 6/2007 Ding
2007/0201397 A1 8/2007 Zhang
2007/0206531 A1 9/2007 Pajukoski et al.
2007/0268861 A1 11/2007 Diachina et al.
2007/0274278 A1 11/2007 Choi et al.
2007/0287440 A1 12/2007 Benkert et al.
2007/0297360 A1 12/2007 Joachim et al.
2008/0013521 A1 1/2008 Rangan et al.
2008/0051098 A1 2/2008 Rao
2008/0081598 A1 4/2008 Chandra et al.
2008/0084851 A1 4/2008 Kim et al.
2008/0146242 A1 6/2008 Alanara et al.
2008/0182609 A1 * 7/2008 Somasundaram et al. ..... H04B 17/327 455/522
2008/0186936 A1 8/2008 Chun et al.
2008/0186944 A1 8/2008 Suzuki et al.
2008/0198869 A1 8/2008 Jiang
2008/0233940 A1 9/2008 Jen
2009/0046617 A1 2/2009 Tenny et al.
2009/0046695 A1 2/2009 Jiang
2009/0104890 A1 4/2009 Wang et al.
2009/0156194 A1 6/2009 Meylan
2009/0175163 A1 7/2009 Sammour et al.
2009/0201798 A1 * 8/2009 Lee ..... H04W 74/002 370/216
2009/0232058 A1 * 9/2009 Lee ..... H04W 74/0833 370/328
2009/0318177 A1 12/2009 Wang et al.
2009/0323574 A1 12/2009 Koskinen et al.
2010/0014466 A1 1/2010 Meyer et al.
2010/0014901 A1 1/2010 Kobashi et al.
2010/0067498 A1 3/2010 Lee et al.
2010/0142457 A1 6/2010 Chun et al.
2010/0290427 A1 11/2010 Sebire et al.
2011/0216705 A1 * 9/2011 Lee ..... H04W 74/002 370/328
2011/0216706 A1 * 9/2011 Lee ..... H04W 74/0833 370/328
2011/0305182 A1 12/2011 Suzuki et al.
2013/0258919 A1 10/2013 Damnjanovic
2021/0014901 A1 * 1/2021 Höglund ..... H04W 74/0833

FOREIGN PATENT DOCUMENTS

CN 1457202 11/2003
CN 1497922 5/2004
CN 1549610 11/2004
CN 1643820 7/2005
CN 1829187 9/2006
CN 1918825 2/2007
CN 101809948 8/2010

(56) References Cited

FOREIGN PATENT DOCUMENTS

| | | | | |
|---|---|---|---|---|
| EP | 1035745 | | 9/2000 | |
| EP | 1343267 | A2 | 9/2003 | |
| EP | l343 267 | | 9/2003 | |
| EP | 1458148 | | 9/2004 | |
| EP | 1 508 992 | A2 | 2/2005 | |
| EP | 1508992 | | 2/2005 | |
| EP | 1557967 | | 7/2005 | |
| EP | 1578111 | | 9/2005 | |
| EP | 1655879 | | 5/2006 | |
| EP | 1689130 | | 8/2006 | |
| EP | 1689130 | A1 | 8/2006 | |
| EP | 1689134 | | 8/2006 | |
| EP | 1 746 855 | A2 | 1/2007 | |
| EP | 1746855 | | 1/2007 | |
| EP | 1 768 297 | A2 | 3/2007 | |
| EP | 1788751 | | 5/2007 | |
| EP | 1 796 405 | A1 | 6/2007 | |
| EP | 1768297 | | 6/2007 | |
| EP | 1796405 | | 6/2007 | |
| EP | 2026523 | | 2/2009 | |
| EP | 1695462 | | 8/2009 | |
| EP | 1695462 | B1 | 8/2009 | |
| EP | 2086276 | | 8/2009 | |
| EP | 2086276 | A2 * | 8/2009 | ..... H04W 74/002 |
| EP | 2108223 | | 9/2015 | |
| JP | 2002-198895 | A | 7/2002 | |
| JP | 2002198895 | | 7/2002 | |
| JP | 2003-516021 | A | 5/2003 | |
| JP | 2003516021 | | 5/2003 | |
| JP | 2007-312244 | A | 11/2007 | |
| JP | 2010519868 | | 6/2010 | |
| KR | 10-2001-0045783 | A | 6/2001 | |
| KR | 1020010045783 | | 6/2001 | |
| KR | 10-2001-0062306 | A | 7/2001 | |
| KR | 1020010062306 | | 7/2001 | |
| KR | 10-2002-0004645 | A | 1/2002 | |
| KR | 1020020004645 | | 1/2002 | |
| KR | 10-2002-0097304 | A | 12/2002 | |
| KR | 1020020097304 | | 12/2002 | |
| KR | 10-2003-0012048 | A | 2/2003 | |
| KR | 1020030012048 | | 2/2003 | |
| KR | 10-2003-0060055 | A | 7/2003 | |
| KR | 1020030060055 | | 7/2003 | |
| KR | 10-2003-0087914 | A | 11/2003 | |
| KR | 1020030087914 | | 11/2003 | |
| KR | 1020040016065 | | 2/2004 | |
| KR | 1020040016334 | | 2/2004 | |
| KR | 10-2004-0034398 | A | 4/2004 | |
| KR | 1020040034398 | | 4/2004 | |
| KR | 10-2004-0039944 | A | 5/2004 | |
| KR | 1020040039944 | | 5/2004 | |
| KR | 10-2004-0072961 | A | 8/2004 | |
| KR | 1020040072961 | | 8/2004 | |
| KR | 10-2005-0022988 | A | 3/2005 | |
| KR | 1020050022988 | | 3/2005 | |
| KR | 1020050029395 | | 3/2005 | |
| KR | 10-2005-0062359 | A | 6/2005 | |
| KR | 1020050062359 | | 6/2005 | |
| KR | 10-2005-0081836 | A | 8/2005 | |
| KR | 1020050081836 | | 8/2005 | |
| KR | 10-2005-0092874 | A | 9/2005 | |
| KR | 1020050092874 | | 9/2005 | |
| KR | 10-2005-0099472 | A | 10/2005 | |
| KR | 10-2005-0100882 | A | 10/2005 | |
| KR | 10-2005-0103127 | A | 10/2005 | |
| KR | 1020050099472 | | 10/2005 | |
| KR | 1020050100882 | | 10/2005 | |
| KR | 1020050103127 | | 10/2005 | |
| KR | 10-2006-0004935 | A | 1/2006 | |
| KR | 1020060004935 | | 1/2006 | |
| KR | 10-2006-0014910 | A | 2/2006 | |
| KR | 1020060014910 | | 2/2006 | |
| KR | 10-2006-0029452 | A | 4/2006 | |
| KR | 1020060029452 | | 4/2006 | |
| KR | 10-2006-0042858 | A | 5/2006 | |
| KR | 1020060042858 | | 5/2006 | |
| KR | 10-2006-0069378 | A | 6/2006 | |
| KR | 1020060069378 | | 6/2006 | |
| KR | 10-2006-0079784 | A | 7/2006 | |
| KR | 1020060079784 | | 7/2006 | |
| KR | 10-2003-0068743 | A | 8/2006 | |
| KR | 10-2006-0090191 | A | 8/2006 | |
| KR | 1020030068743 | | 8/2006 | |
| KR | 1020060090191 | | 8/2006 | |
| KR | 10-2006-0134058 | A | 12/2006 | |
| KR | 1020060131671 | | 12/2006 | |
| KR | 1020060134058 | | 12/2006 | |
| KR | 10-2007-0048552 | A | 5/2007 | |
| KR | 1020070048552 | | 5/2007 | |
| KR | 10-2007-0076374 | A | 7/2007 | |
| KR | 1020070073577 | | 7/2007 | |
| KR | 1020070073588 | | 7/2007 | |
| KR | 1020070076374 | | 7/2007 | |
| KR | 10-2008-0039176 | A | 5/2008 | |
| KR | 1020080039176 | | 5/2008 | |
| KR | 1020080085694 | | 9/2008 | |
| KR | 1020090084320 | | 8/2009 | |
| RU | 2304348 | | 8/2007 | |
| WO | WO9937114 | | 7/1999 | |
| WO | WO0122645 | | 3/2001 | |
| WO | WO0124411 | | 4/2001 | |
| WO | WO 01/39386 | A1 | 5/2001 | |
| WO | WO0139386 | | 5/2001 | |
| WO | WO0167664 | | 9/2001 | |
| WO | WO0201742 | | 1/2002 | |
| WO | WO0245453 | | 6/2002 | |
| WO | WO 03/045103 | A1 | 5/2003 | |
| WO | WO03045103 | | 5/2003 | |
| WO | WO 2004/042953 | A1 | 5/2004 | |
| WO | WO-2004/042963 | A1 | 5/2004 | |
| WO | WO2004042953 | | 5/2004 | |
| WO | WO2004042963 | | 5/2004 | |
| WO | WO2004042964 | | 5/2004 | |
| WO | WO2004100537 | | 11/2004 | |
| WO | WO-2005/039108 | A2 | 4/2005 | |
| WO | WO2005039108 | | 4/2005 | |
| WO | WO 2005/122441 | A1 | 12/2005 | |
| WO | WO 2005/125226 | A2 | 12/2005 | |
| WO | WO2005122441 | | 12/2005 | |
| WO | WO2005125226 | | 12/2005 | |
| WO | WO 2006/046894 | A1 | 5/2006 | |
| WO | WO-2006/052086 | A2 | 5/2006 | |
| WO | WO2006046894 | | 5/2006 | |
| WO | WO2006052086 | | 5/2006 | |
| WO | WO2006083149 | | 8/2006 | |
| WO | WO-2006/118418 | A2 | 11/2006 | |
| WO | WO2006118418 | | 11/2006 | |
| WO | 2007/020070 | A2 | 2/2007 | |
| WO | WO2007020070 | | 2/2007 | |
| WO | WO-2007/024065 | A1 | 3/2007 | |
| WO | WO2007024065 | | 3/2007 | |
| WO | WO 2007/039023 | A1 | 4/2007 | |
| WO | WO2007039023 | | 4/2007 | |
| WO | WO-2007/052900 | A1 | 5/2007 | |
| WO | WO2007052900 | | 5/2007 | |
| WO | WO 2007/066900 | A1 | 6/2007 | |
| WO | WO2007066900 | | 6/2007 | |
| WO | WO 2007/078142 | A1 | 7/2007 | |
| WO | WO-2007/078164 | A1 | 7/2007 | |
| WO | WO-2007/078173 | A1 | 7/2007 | |
| WO | WO 2007/078174 | A1 | 7/2007 | |
| WO | WO2007078142 | | 7/2007 | |
| WO | WO2007078156 | | 7/2007 | |
| WO | WO2007078164 | | 7/2007 | |
| WO | WO2007078173 | | 7/2007 | |
| WO | WO2007078174 | | 7/2007 | |
| WO | WO-2007/089797 | A2 | 8/2007 | |
| WO | WO 2007/091831 | A2 | 8/2007 | |
| WO | WO2007089797 | | 8/2007 | |
| WO | WO2007091831 | | 8/2007 | |
| WO | WO2007091838 | | 8/2007 | |
| WO | 2007312244 | | 11/2007 | |
| WO | WO-2007/126793 | A2 | 11/2007 | |
| WO | WO2007126793 | | 11/2007 | |

(56) References Cited

FOREIGN PATENT DOCUMENTS

| | | | |
|---|---|---|---|
| WO | WO-2007/147431 | A1 | 12/2007 |
| WO | WO2007147431 | | 12/2007 |
| WO | WO 2008/004725 | A1 | 1/2008 |
| WO | WO2008004725 | | 1/2008 |
| WO | WO2008060097 | | 5/2008 |
| WO | WO2008094120 | | 8/2008 |
| WO | WO2009045945 | | 4/2009 |

OTHER PUBLICATIONS

"LG Electronics Inc., ""Handling of HFN de-synchronization,"" R2-074746, 3GPP TSG-RAN WG2 #60 , Je ju, Korea, Nov. 5-9, 2007, pp. 1-2".
"LG Electronics, ""Discussion on Message 4 in Random Access,"" R2-073354, 3GPP TSG-RAN WG2 #59 , Athens, Greece , Aug. 20-24, 2007, pp. 1-4".
"LG Electronics, ""Resource request in Synchronized Case,"" R2-061018 , TSG-RAN Working Group 2 #52 , Athens , Greece, Mar. 27-31, 2005, pp. 1-2".
"Motorola et al., ""E-UTRA Random Access Channel TP from email discussion,"" R1-060885, 3GPP TSG RAN1#44-bis, Athens, Greece, Mar. 27-30, 2006, 6 pages".
"Motorola: ""Contention-free Intra-LTE Handover"", 3GPP Draft, R2-070730-Non_Cont_Handoff_vol. 3rd Generation Partnership Project (3GPP), vol. RAN WG2, no. St. Louis, USA: Feb. 9, 2007, (Feb. 9, 2007), XP050133763."
"Nokia Corporation et al., ""MAC Header Format,"" R2-073891, 3GPP TSG-RAN WG2 Meeting #59bis, Shanghai, China, Oct. 8-12, 2007, 5 pages".
"Nokia Siemens Netw Orks, ""Security Update , "" R2-074526 , 3GPP TSG-RAN2 Meeting #59bis, Shanghai, China, Oct. 8-12, 2007, 4 pages".
"NTT Docomo, Inc., ""Uplink synchronization,"" R2-070781 , 3GPP TSG RAN WG2 #57, St. Louis, USA, Feb. 12-16, 2007, 3 pages".
"Samsung, ""MAC functions: ARQ,"" R2-060374, 3GPP TSG-RAN2 Meeting #51, Denver, U.S.A, Feb. 13-17, 2006, 5 pages".
"Samsung, ""Optimization of contention resolution in aRACH,"" R2-072797, 3GPP TSG-RAN WG2#58bis, Orlando, USA, Jun. 25-29, 2007, 3 pages".
"Texas Instruments: ""UL Synchronization Management in LTE_Active"", 3GPP Draft; R1-071478_ULSYNC, 3rd Generation Partnership Project (3GPP); vol. Ran WG1. no. St. Julian, Mar. 21, 2007, (Mar. 21, 2007), XP050105413."
Ericcson: "Scheduling Request in E-UTRAN", 3GPP Draft, R1-070471, 3rd Generation Partnership Project (3GPP), vol. RAN WG1, no. Sorrento, Italy; Jan. 10, 2007, (Jan. 10, 2007), XP050104502.
Ericsson, "Text proposal on scheduling request triggering criterions for LTE," R2-073210, 3GPP TSG-RAN WG2 #59, Athens , Greece, Aug. 20-24, 2007, pp. 1-2.
Ghosh, A. et al.; "Random Access Design for UMTS Air-Interface Evolution", Vehicular Technology Conference, 2007. VTC2007-Spring.IEEE 65th Publication, Apr. 22-25, 2007, pp. 1041-1045.
LG Electronics Inc., "Security de-synchronization," R2-073258, 3GPP TSG-RAN WG2 #59, Athens, Greece, Aug. 20-24, 2007 (retrieved on Aug. 18, 2007), pp. 1-2.
LG Electronics, "Overall control signaling structure for generic LTE TDD," R1-071848, 3GPP TSG RAN WG1 LTE TDD Ad Hoc, Beijing, China, Apr. 17-20, 2007, pp. 1-4.
Motorola, "RLC Polling Related Issues," 3GPP TSG-RAN WG2, R2-073538, Athens, Greece, Aug. 20-24, 2007, 2 pages.
Nec et al., "Need for MAC contention-resolution for non-initial access," R2-073092, 3GPP TSG-RAN WG2 Meeting #59, Athens, Greece, Aug. 20-24, 2007, 3 pages.
Nokia, "System Information Change Indication," R2-071739, 3GPP TSG-RAN WG2 Meeting #57bis, Kobe, Japan, May 7-11, 2007, pp. 1-3.
NTT Docomo, "Random Access Channel Structure for E-UTRA Uplink," R2-061064, 3GPP TSG-RAN WG1 and WG2 Joing Meeting, Athens, Greece, Mar. 27-31, 2006, pp. 1-8.
NTT Docomo, Inc., "RA response format," R2-080451, 3GPP TSG RAN WG2 #60bis, Sevilla, Spain, Jan. 14-18, 2008 (retrieved on Jan. 8, 2008), 2 pages.
Panasonic , "Random access design for E-UTRA uplink," R1-061114, TSG-RAN WG1 Meeting#45, Shanghai, China, May 8-12, 2006, pp. 1-5.
RU-2291594-C2 not available; Abstract only provided, as well as corresponding W0-2004/042953-A1.
Siemens, "Signaling in DL for uplink resource allocation," R1-061290,3GPP TSG RAN WG1#45, Shanghai, China, May 8-12, 2006 (retrieved on May 2, 2006), pp. 1-6.
Texas Instruments: "UL synchronization Management and Maintenance in E-UTRA", 3GPP Draft: R1-072198_ULSYNC, 3rd Generation Partnership Project (3GPP); vol. RAN WG1, no. Kobe, Japan; May 1, 2007, (May 1, 2007), XP050105936.
Wu et al, Enhanced Random Access Response Formats In E-UTRN, U.S. Appl. No. 61/006,348.
3rd Generation Partnership Project; Technical Specification Group Radio Access Network, "Evolved Universal Terrestrial Radio Access (E-UTRA) Medium Access Control (MAC) protocol specification (Release 8)," 3GPP TS 36.32, V8.1.0, dated Mar. 2008, 30 pages.
3rd Generation Partnership Project; Technical Specification Group Radio Access Network, "Evolved Universal Terrestrial Radio Access (E-UTRA) Radio Link Control (RLC) protocol specification (Release 8)," 3GPP TS 36.322, V8.0.0, Dec. 2007, 35 pages.
Ericsson, "Format of Random Access Response," R2-074938, 3GPP TSG-RAN WG2 #60, Jeju, Korea, dated Nov. 5-9, 2007, 4 pages.
Ericsson, "Clarification to the handling of large RLC status reports," R2-082018, 3GPP TSG-RAN2 Meeting #61bis, Shenzhen, China, dated Mar. 31-Apr. 4, 2008, 4 pages.
Ericsson, "RLC status report format," R2-074701, TSG-RAN WG2 Meeting #60, Jeju Island, Korea, dated Nov. 5-9, 2007, 3 pages.
LG Electronics Inc., NTT DoCoMo, "ACK_SN setting for short Status PDU," R2-082133, 3GPP TSG-RAN WG2 #62, Kansas City, USA, dated May 5-9, 2008, 2 pages.
Motorola, "LTE Random Access Procedure," R2-061463, 3GPP TSG-RAN WG2 #53, Shanghai, China, dated May 8-12, 2006, pp. 1-4.
Nokia Corporation, Nokia Siemens Networks, "Random Access Message Two," R2-080948, 3GPP TSG-RAN WG2 Meeting #61, Sorrento, Italy, dated Feb. 11-15, 2008, 4 pages.
Nokia Siemens Networks, Nokia Corporation, "Open issues in RACH overload control," R2-080221, 3GPP TSG-RAN WG2 Meeting #60bis, Sevilla, Spain, dated Jan. 14 -18, 2008, 5 pages.
TS 36.322 Editor (NTT DoCoMo, Inc.), "Miscellaneous corrections to TS 36.322," R2-081700, 3GPP TSG-RAN2 Meeting #61bis, Shenzhen, China, dated Mar. 31-Apr. 4, 2008, 13 pages.
Kashima, Method and Apparatus for Providing Timing Alignment, U.S. Appl. No. 60/944,662.*
Wu et al, Enhanced Random Access Rsponse Formats in E-UTRN, U.S. Appl. No. 61/006,348.*
Nec, "Optimized buffer status reporting", 3GPP TSG-RAN WG2#58bis Meeting, Orlando, FL, USA, Jun. 25-29, 2007, vol. R2-072515, pp. 1-6, XP002503220, www.3gpp.org.
Catt, Ritt, "Consideration on UL buffer reporting", 3GPP TSG-RAN WG2#55, R2-062934, Oct. 9, 2006, pp. 1-3, XP002513924, http://www.3gpp.org/ftp/tsg_ran/WG2_RL2/TSGR2_55/Documents/.
Wang et al., U.S. Appl. No. 60/976,139.
Sammour et al., U.S. Appl. No. 61/019,058.
Sadayuki Abeta et al., "Super 3G Technology Trends. Part 2: Research on Super 3G Technology", NTT DoCoMo Technical Journal, vol. 8, No. 3, pp. 55-62, Dec. 2006, See Section 3; Figure 5.
Nokia, "System Information Distribution", 3GPP TSG-RAN WG2 Ad Hoc Meeting on LTE, R2-061487, Cannes, France, pp. 1-3, Jun. 27-30, 2006, See Section 2.
LG Electronics, "Delivery of LTE System Information", 3GPP TSG-RAN WG2 Ad Hoc on LTE, R2-061959, Cannes, France, pp. 1-4, Jun. 27-30, 2006, See Section 3.

(56) References Cited

OTHER PUBLICATIONS

XP050131180; ZTE; "Redundant Retransmission Restraint in RLC-AM" 3GPP Draft; Rs-061234.
XP014038519; "Digital Cellular Telecommunications System (Phase 2+); Functional Stage 2 Description of Location Services (LSC) in GERAN (3GPP TS 43.059 version 7.3.0 Release 7); ETSI TS 143 059."
LG Electronics Inc: "UE State Transition in LTE_Active", 3GPP Draft: R2-061002 UE State Transition in LTE_Active Mode, 3rd Generation Partnership Project (3GPP); vol. RAN WG2, No. Athens, Greece; 20061323 (Mar. 23, 2006), XP050130928.
Texas Instruments: "UL synchronization Management and Maintenance in E-UTRA", 3GPP Draft; R1-072198_ULSYNC, 3rd Generation Partnership Project (3GPP); vol. RAN WG1, No. Kobe, Japan; May 1, 2007, XP050105936.
3GPP TSG RAN WG2 #59, NTTDoCoMo, Inc., "Buffer Status Report and Scheduling Request Triggers," Aug. 20-24, 2007, Athens, Greece, R2-073574, four (4) pages.
3GPP TSG-RAN WG1 #48, QUALCOMM Europe, "Further Details on RACH Procedure," Feb. 12-16, 2007, St. Louis, Missouri, R1-070649, pp. 1-4.

* cited by examiner

[MAC RAR structure]

[MAC RAR structure for option 2a]

(a) In case RAID is added in subheader (b) In case BO parameter is added in subheader

[MAC sub-header for option 2b]

[MAC RAR structure for option 2b]

METHOD FOR SIGNALING BACK-OFF INFORMATION IN RANDOM ACCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a continuation reissue application of U.S. application Ser. No. 15/826,172 filed on Nov. 29, 2017, now U.S. Pat. No. RE48,836, which is a reissue application of U.S. Pat. No. 8,040,913 issued on Oct. 18, 2011, which* is a continuation of [co-pending] U.S. application Ser. No. 12/362,993 filed on Jan. 30, 2009, *now U.S. Pat. No. 8,027,356 issued on Sep. 27, 2011*, which claims the benefit of U.S. provisional application 61/025,267, filed on Jan. 31, 2008, *and* Korean Patent Application No. 10-2009-0005439 filed on Jan. 22, 2009, which are hereby incorporated by reference as if fully set forth herein.

BACKGROUND OF THE INVENTION

1. Field of the Invention

The present invention relates to a wireless communication system, and more particularly, to a method for performing random access in a wireless communication system.

2. Discussion of the Related Art

The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

The E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may exist for one eNB. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

FIG. 1 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through a S1 interface.

FIGS. 2 and 3 illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIGS. 2 and 3 can be divided into an L1 layer (first layer), an L2 layer (second layer) and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not be existed. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, reconfiguration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a process flow diagram illustrating a contention-based random access procedure.

The random access procedure is used to transmit short-length data in uplink. For example, the random access procedure is performed upon initial access in an RRC idle mode, upon initial access after radio link failure, upon handover requiring the random access procedure, and upon the occurrence of uplink/downlink data requiring the random access procedure during an RRC connected mode. Some RRC messages such as an RRC connection request message, a cell update message, and an URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

As shown in FIG. 5, a UE receives and stores information regarding random access from an eNB through system information. Thereafter, when random access is needed, the UE transmits a random access preamble (message 1) to the eNB (S510). After transmitting the random access preamble (message 1), the UE monitors a PDCCH during a predetermined period of time in order to receive a random access response message. After receiving the random access preamble from the UE, the eNB transmits a random access response (message 2) to the UE (S520). Specifically, downlink scheduling information for the random access response message can be CRC-masked with a Random Access-RNTI and can be transmitted through an L1/L2 control channel (PDCCH). Upon receiving the downlink scheduling signal masked with the RA-RNTI, the UE can receive and decode a random access response message from a PDSCH. Thereafter, the UE checks whether or not a random access response corresponding to the UE is present in the received random access response message. Whether or not a random access response corresponding to the UE is present can be determined based on whether or not a RAID for the preamble that the UE has transmitted is present. After receiving response information, the UE transmits an uplink message (Message 3) through an uplink SCH according to information regarding radio resources included in the response information (S530). After receiving the uplink message from the UE, the eNB transmits a contention resolution message (Message 4) (S540).

When random access has failed, the UE performs back-off. Here, the term "back-off" refers to delaying, by a UE, an access attempt by an arbitrary or predetermined time. If the UE makes an access attempt immediately after random access has failed, the access attempt is likely to fail again for the same or similar reason. Accordingly, when random access has failed, the UE delays an access attempt by a predetermined time to prevent waste of radio resources due to failure of the access attempt and to increase the probability that the random access is successful.

FIG. 6 illustrates a method for signaling back-off information according to a conventional technology.

As shown in FIG. 6, an eNB transmits a back-off parameter to all UEs in the cell through system information (S610). Thereafter, the UE performs its own back-off setting using a back-off parameter obtained from the system information. When random access is needed, the UE transmits a preamble for random access to the eNB (S620). The preamble may include a Random Access IDentity (RAID). Thereafter, when a random access procedure has failed for some reason, the UE performs back-off (S630). Thereafter, the UE retransmits a preamble for random access to the eNB (S640).

In the conventional technology, the UE should receive and store a back-off parameter through system information before making random access since the back-off parameter was broadcast through system information. Since a back-off parameter should be periodically broadcast through system information, a downlink overhead is always broadcast even when back-off is not performed since random access is successful. In addition, it may also be necessary to apply a different back-off parameter due to a cause such as load. However, since a back-off parameter is broadcast through system information, each UE in the cell cannot perform different back-off.

SUMMARY OF THE INVENTION

Accordingly, the present invention is directed to a method for performing random access in a wireless communication system that substantially obviates one or more problems due to limitations and disadvantages of the related art.

An object of the present invention is to provide a method for reducing overhead and increasing the efficiency of radio resources in association with a random access procedure performed in a wireless communication system.

Another object of the present invention is to provide a method for efficiently signaling back-off information in random access.

Another object of the present invention is to provide a message format used for signaling back-off information in random access.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing random access in a wireless communication system includes transmitting a preamble for random access in uplink; receiving a random access response message including back-off information as a response to the preamble; and performing back-off using the back-off information when the random access has failed. The method may further include obtaining the back-off information from the random access response message. The method may further include retransmitting a preamble for random access in uplink.

In another aspect of the present invention, a method for performing random access in a wireless communication system includes receiving a preamble for random access; and transmitting a random access response message including back-off information as a response to the preamble in downlink.

The embodiments of the present invention have the following advantages.

First, it is possible to reduce overhead and increase the efficiency of radio resources in association with a random access procedure performed in a wireless communication system.

Second, it is possible to signal back-off information only when random access is needed, thereby reducing overhead.

Third, it is possible to apply different back-off information to each UE in random access.

Fourth, it is possible to provide a message format for signaling back-off information in random access.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Embodiment

Back-Off Information Signaling Using Random Access Response Message

Figure 1:
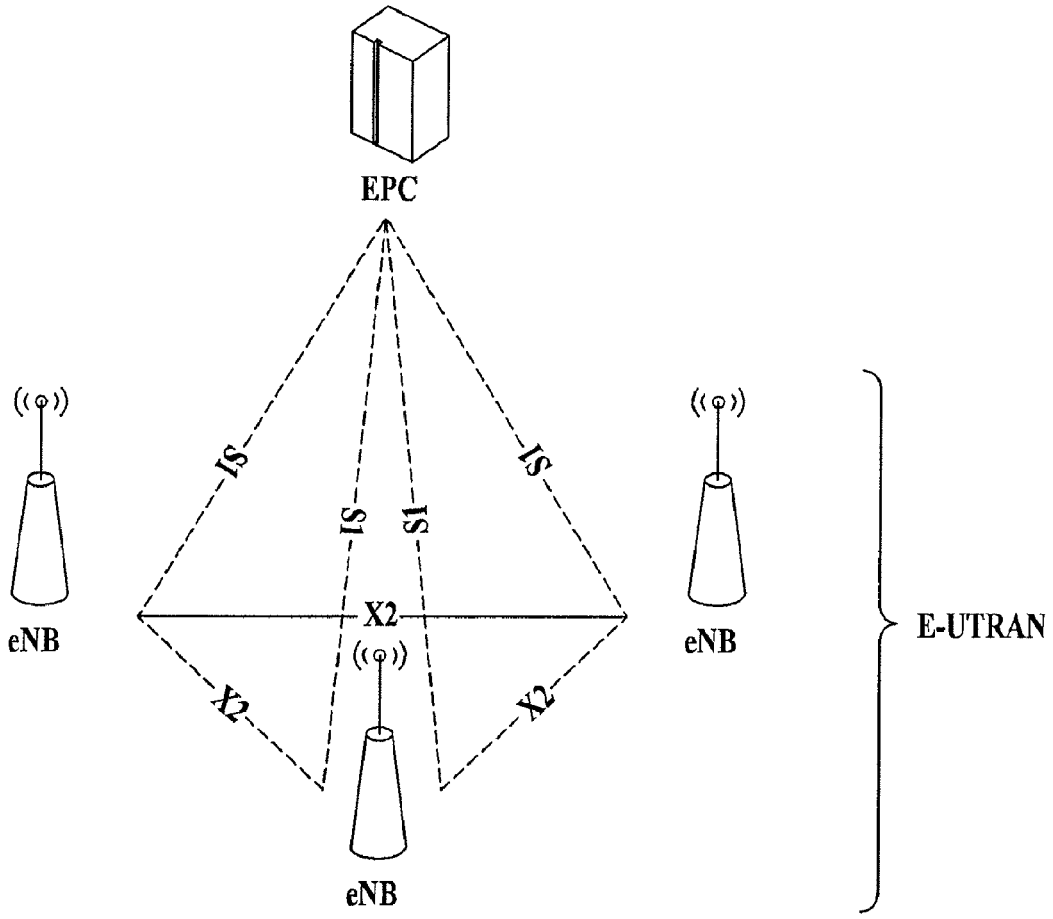
FIG. 1 Prior Art
FIG. 1 illustrates a schematic structure of an Evolved Universal Terrestrial Radio Access Network (E-UTRAN)
Figure 2:
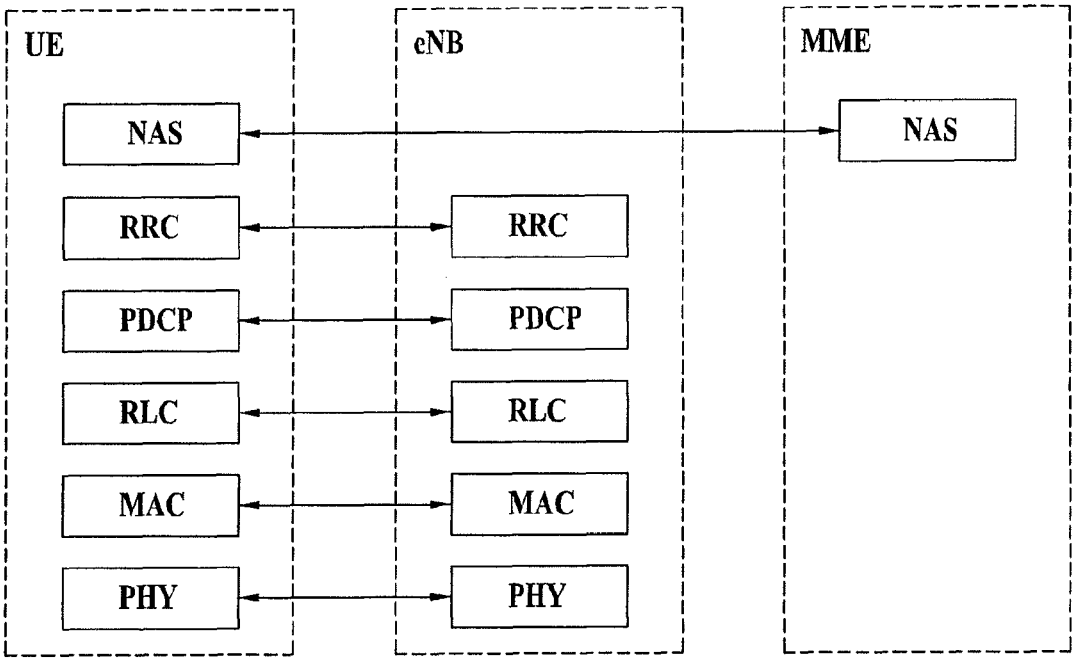
FIG. 2 Prior Art
FIGS. 2 and 3 illustrate the configurations of a radio interface protocol between a UE and a UTRAN.
Figure 3:
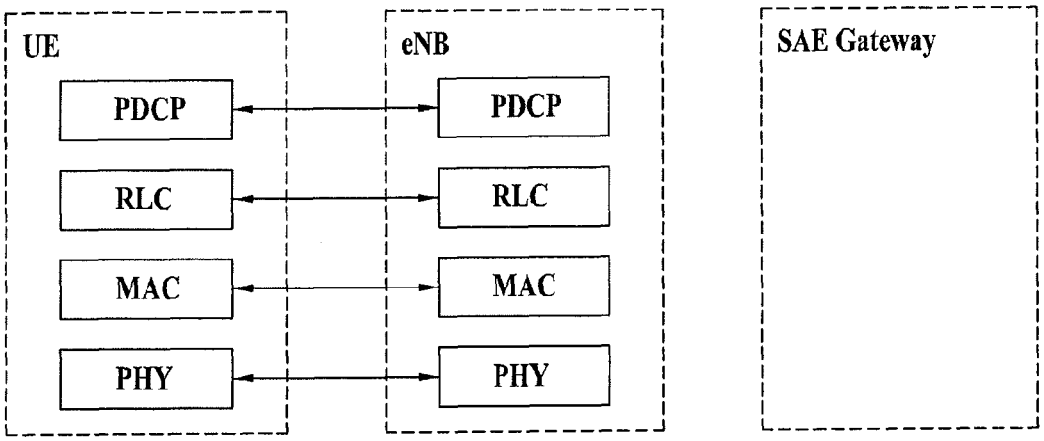
FIG. 3 Prior Art
Figure 4:
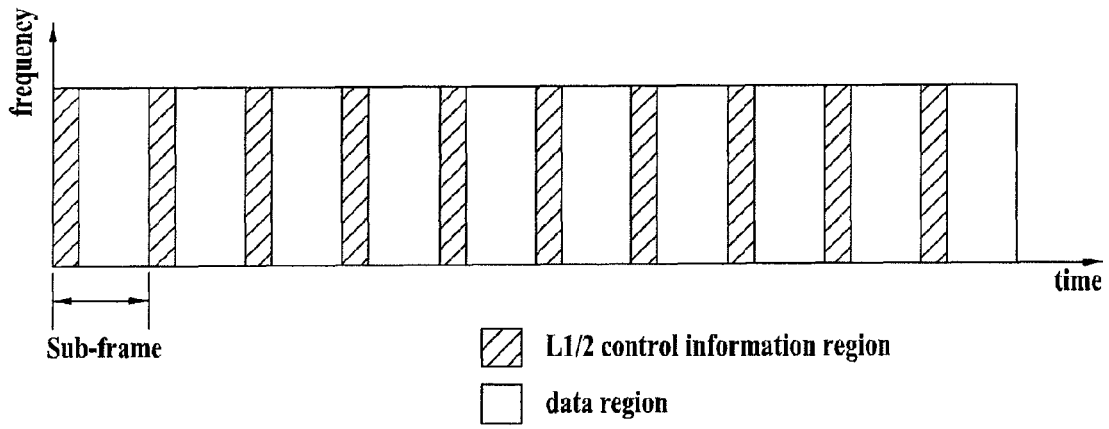
FIG. 4 Prior Art
FIG. 4 illustrates an example physical channel structure used in an E-UMTS system.
Figure 5:
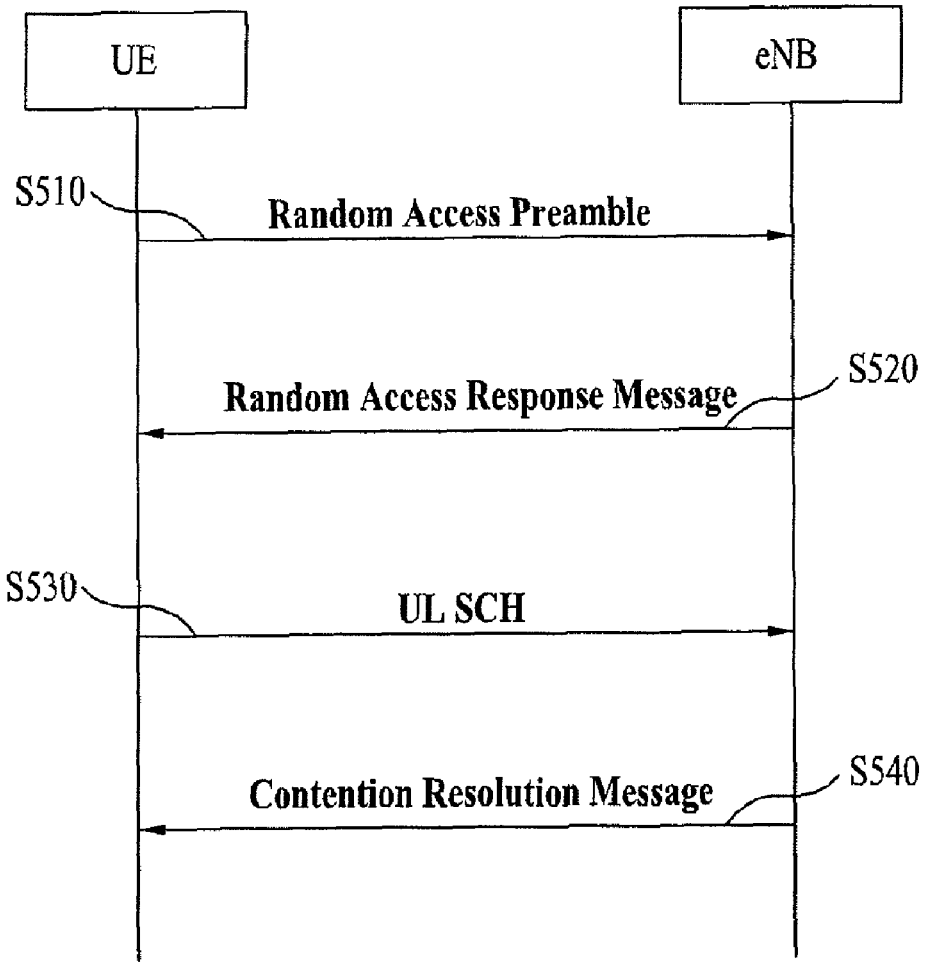
FIG. 5 Prior Art
FIG. 5 illustrates an example method for performing a contention-based random access procedure.
Figure 6:
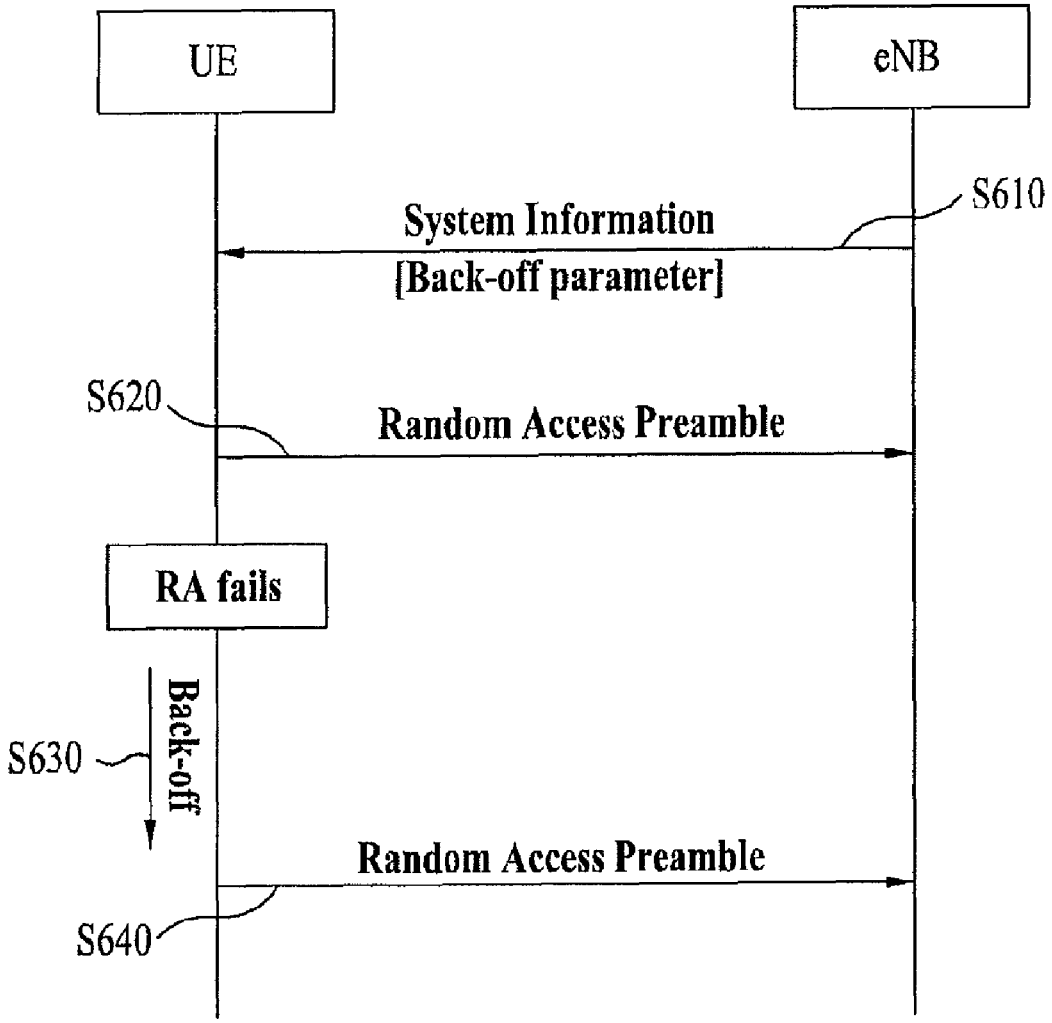
FIG. 6 Prior Art
FIG. 6 illustrates a method for signaling a back-off parameter regarding random access according to a conventional technology.
Figure 7:
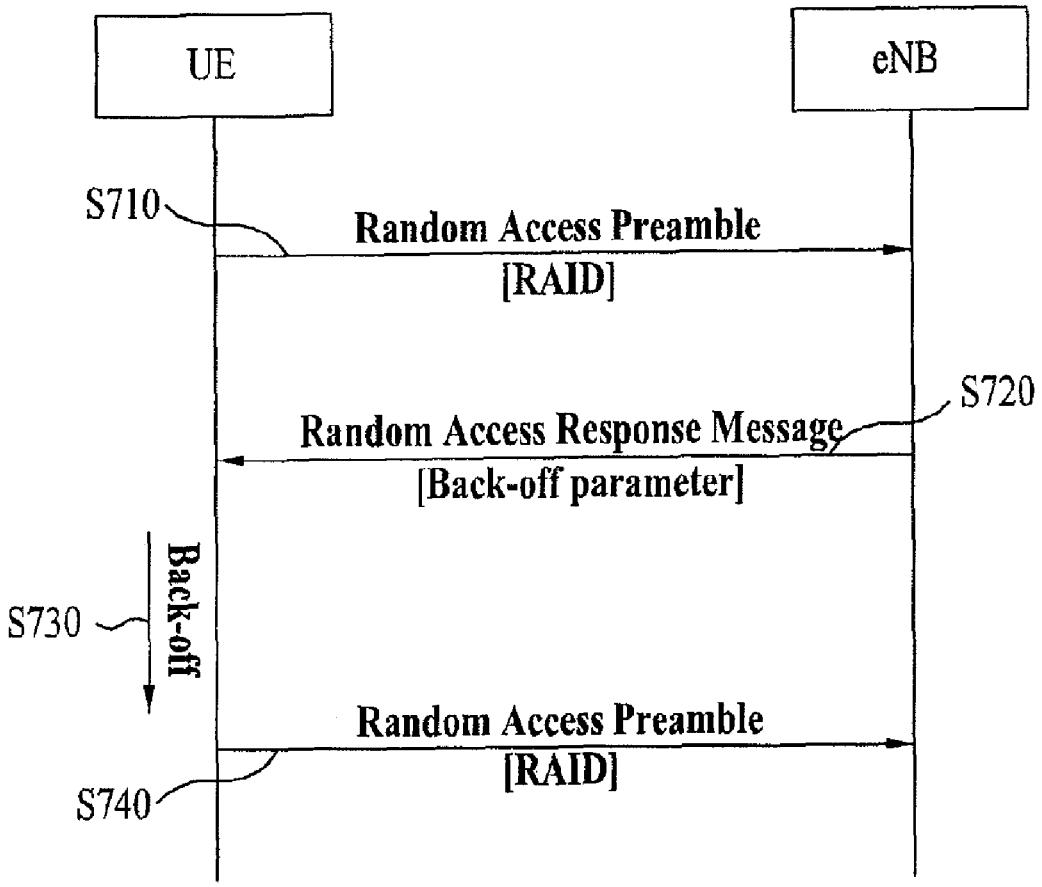
FIG. 7 illustrates a method for signaling back-off information regarding random access according to an embodiment of the present invention.

FIG. 7 illustrates a method for performing random access according to an embodiment of the present invention.

As shown in FIG. 7, a UE transmits a random access preamble including a RAID. The random access preamble is transmitted through a Random Access Channel (RACH) (S710).

Thereafter, an eNB receives the random access preamble and transmits a random access response message including back-off information, as a response to the random access preamble, to the UE. The UE obtains the back-off information from the received random access response message (S720). The format of the random access response message may vary according to a protocol layer that makes a response to the random access preamble. For example, the protocol layer may be a MAC layer. In this case, the random access response message may include a MAC header. The random access response message may further include a MAC Random Access Response (RAR) for one or more UEs. In this case, a MAC RAR for a specific UE may be indicated using a RAID included in a random access preamble transmitted by the UE. The back-off information may be included in a MAC header or a MAC RAR.

The back-off information indicates information required to perform back-off. For example, the back-off information may include a back-off parameter. The back-off parameter may include a delay time for retransmission of a random access preamble or an upper delay time limit. The back-off information may further include information regarding a UE to which the back-off parameter is applied. The back-off information may include a back-off parameter or an index, an identity (or identification), an indicator, simplified information, or the like for indicating a specific UE. The size of the back-off information is not limited to a specific size. For example, the size of the back-off information may be 6 bits or less. The following table illustrates an example of the back-off parameter.

TABLE 1

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |

When the back-off parameter is indicated by an index, the index can be expressed by 4 bits.

A method for signaling back-off information using the random access response message will be described later in detail with reference to FIGS. 9 to 17. One important feature of this method is that back-off information is included in the random access response message so that back-off information is provided to the UE only when the UE has requested random access, thereby increasing the efficiency of radio resources and reducing a downlink overhead for signaling back-off.

Thereafter, when random access has failed, the UE performs back-off using the obtained back-off information (for example, a back-off parameter) (S730). Here, the term "back-off" refers to delaying, by a UE, an access attempt by an arbitrary or predetermined time. Specifically, the UE delays transmission of a random access preamble according to the back-off parameter. More specifically, the UE may delay an access attempt by a time indicated by the back-off parameter. In addition, the UE may delay an access attempt randomly within the time indicated by the back-off parameter. That is, the UE can delay an access attempt by a time that is selected with equal probability from a range of 0 ms to the back-off parameter.

The following are the cases where random access has failed. The first case is where the UE has failed to receive a random access response message. The second case is where, although the UE has received a random access response message, no random access response corresponding to the UE is present in the random access response message. The third case is that the UE has failed to perform uplink transmission using radio resources allocated through a random access response message. For example, the uplink transmission includes PUSCH transmission. The fourth case is where the UE has failed to pass through a contention resolution procedure for random access. The contention resolution procedure includes a MAC contention resolution procedure or an RLC contention resolution procedure.

Depending on the cause of the failure of random access, the UE may also fail to obtain back-off information from the random access response message. In this case, the UE may use a default back-off parameter or a back-off parameter obtained from a previous random access response message. The default back-off parameter includes 0 ms.

After performing back-off, the UE retransmits a random access preamble including a RAID (S740).

Figure 8:
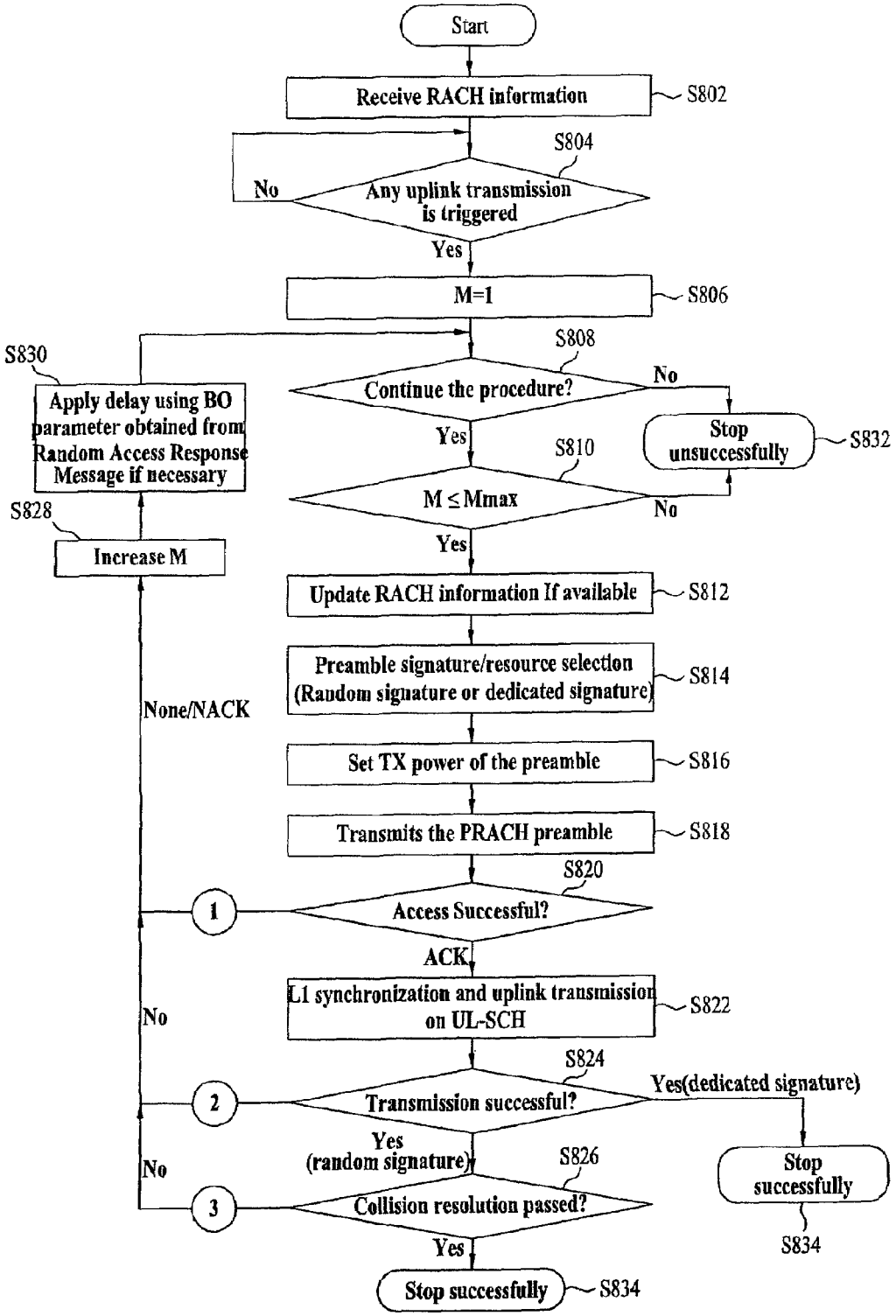
FIG. 8 is a flow chart illustrating a random access procedure according to an embodiment of the present invention.

FIG. 8 is a flow chart illustrating a random access procedure according to an embodiment of the present invention.

As shown in FIG. 8, a UE receives RACH information (S802). When no separate uplink transmission channel is present, the UE performs a random access procedure in the following manner (S804).

The UE initializes a random access preamble counter M to "1" (S806). Thereafter, the UE decides whether or not to perform a random access procedure (S808). Thereafter, when the UE has decided to continue the random access procedure, the UE determines whether or not the value of the counter M is equal to or less than a maximum allowable value Mmax (S810). When the value of the counter M exceeds the maximum allowable value Mmax, the UE terminates the random access procedure (S832). Otherwise, the UE continues the random access procedure. As needed, the UE updates RACH information (S812) and selects a preamble signature/resource (S814). Thereafter, the UE determines preamble transmission power (S816) and transmits a PRACH preamble to an eNB (S818).

After transmitting the preamble, the UE determines whether or not an initial access procedure using the preamble is successful while monitoring an L1/L2 control region in order to receive a random access response message during a predetermined time (S820). For example, the UE determines that the initial access procedure has failed when the UE has failed to receive a downlink scheduling signal masked with an RA-RNTI within the predetermined time. The UE also determines that the initial access procedure has failed when information regarding the UE is not included in the random access response message although the UE has received a downlink scheduling signal masked with an RA-RNTI and has decoded the random access response message. The UE increases the counter value "M" by 1 (S828) and performs back-off when needed (□ S830). In this case, the back-off parameter is a default value including 0 ms or a value obtained through a previous random access response message.

When the UE has successfully received the random access response message, the UE adjust transmission timing using information obtained from the random access response and transmits an uplink message through an uplink SCH (S822). When the eNB has not successfully received the uplink message, the UE increases the counter value "M" by 1 (S828) and performs back-off using a back-off parameter obtained from the random access response message when needed (□ S830).

When the uplink message has been successfully transmitted to the eNB, the eNB transmits a contention resolution message to the UE in downlink. Thereafter, when the UE has passed through the contention resolution procedure, the UE terminates the random access procedure. On the other hand, when the UE has passed through the contention resolution procedure, the UE increases M by 1 (S828) and performs back-off using a back-off parameter obtained from the random access response message when needed (□ S830).

After performing back-off, the UE repeats the random access procedure, starting from step S808.

Figure 9:
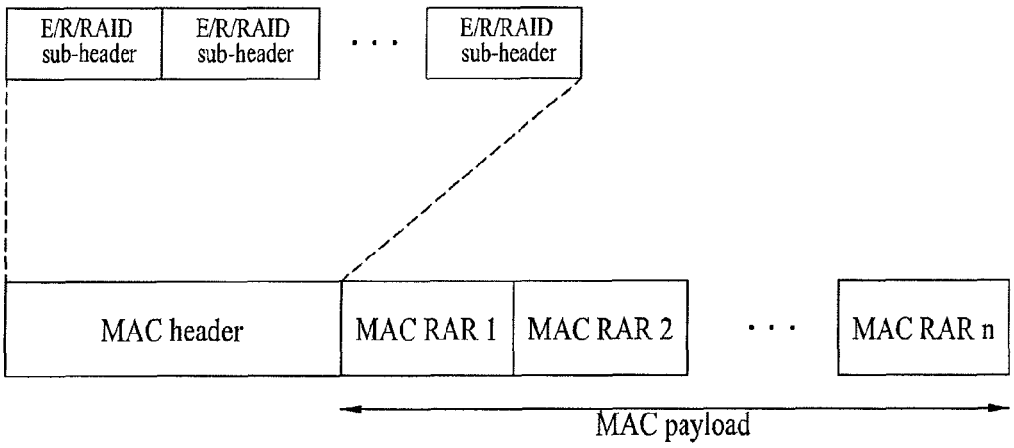
FIG. 9 illustrates a MAC PDU structure of a random access response message applied to an embodiment of the present invention.

FIG. 9 illustrates a MAC PDU structure of a random access response message applied to an embodiment of the present invention. A MAC PDU is transmitted to a UE through a downlink SCH channel.

As shown in FIG. 9, one MAC PDU includes a MAC header and MAC payload. The MAC header includes one or more MAC sub-headers (for example, E/R/RAID sub-headers) and the MAC payload includes one or more MAC RARs. The MAC sub-headers correspond to the MAC RARs, respectively.

Figure 10:
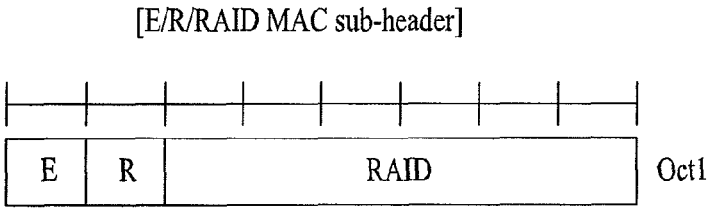
FIG. 10 illustrates a structure of an E/R/RAID MAC sub-header.

FIG. 10 illustrates a structure of an E/R/RAID MAC sub-header.

As shown in FIG. 10, the E/R/RAID MAC sub-header includes an E field, an R field, and a RAID field. The fields of the MAC sub-header are arranged on an octet (byte) basis. The following is a description of each of the fields.

- E field: Extension field. This field serves as a flag indicating whether or not an additional field is included in the MAC header. When the E field is set to "1", this indicates that another E/R/RAID field (sub-header) is present. When the E field is set to "0", this indicates that a MAC RAR starts from the next byte.
- R field: Field including a reserved bit. This field currently has no usage and can be defined and used as needed at a later time. The size of the R field is 1 bit.
- RAID field: Field identifying a random access preamble transmitted from a UE. The size of the RAID field is 6 bits.

Back-off information signaling using a MAC sub-header will be described later in detail.

Figure 11:
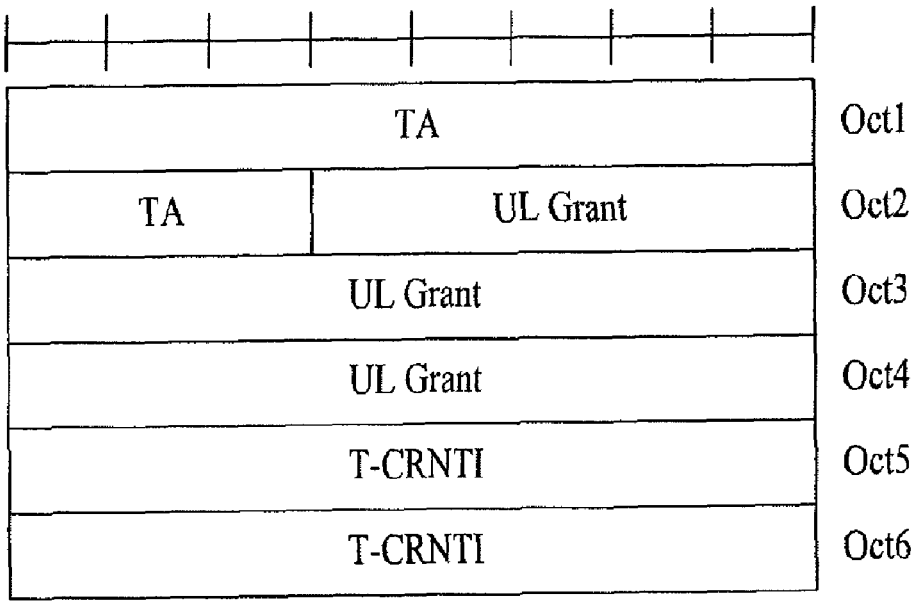
FIG. 11 illustrates a MAC RAR structure.

FIG. 11 illustrates a MAC RAR structure. As shown in FIG. 11, a MAC RAR includes a TA field, a UL grant field, and a T-CRNTI field. The fields of the MAC RAR are arranged on an octet (byte) basis. The following is a description of each of the fields.

- TA field: Timing Advance field. The TA field indicates uplink transmission timing required for timing synchronization. The size of the TA field is 11 bits.
- UL Grant field: Uplink grant field. The UL grant field indicates allocation information of radio resources used in uplink. The size of the UL grant field is 21 bits.
- T-CRNTI field: Temporary CRNTI field. The T-CRNTI field indicates a temporary identification used by the UE before another random access procedure is initiated or before the contention resolution procedure has passed. The size of the T-CRNTI field is 16 bits.

The following is a detailed description of signaling of back-off information using a random access response message (for example, a MAC PDU).

Back-off information included in a random access response message may be dedicated back-off information or common back-off information depending on implementations. In this specification, the term "dedicated back-off information" refers to back-off information that is individually applied to each of a plurality of UEs that use different random access preambles. For example, the dedicated back-off information may be defined for each RAID used to identify a random access preamble transmitted by the UE. In this case, the same back-off information is applied to UEs that use the same RAID while different back-off information is applied to UEs that use different RAIDS. The term "common back-off information" refers to back-off information that is commonly applied to UEs that use different random access preambles. For example, common back-off information may be defined for a specific RAID group or for each random access response message. Thus, the same back-off information is applied to UEs even when the UEs use different RAIDs.

The following are descriptions of three possible options regarding signaling back-off information through a MAC PDU.

Option 1: Inclusion of Dedicated Back-Off Information

Back-off information can be included in a random access response message for each RAID. Specifically, a back-off parameter can be included in a respective MAC RAR corresponding to each RAID. Since a back-off parameter is mapped one-to-one to a RAID, the back-off parameter is RAID-specific. That is, the back-off parameter is commonly applied to one or more UEs that have accessed a random access response message using the same RAID. On the other hand, different back-off parameters are applied to one or more UEs that have accessed a random access response message using different RAIDs. Since a different back-off parameter can be applied to each RAID in this manner, the back-off parameter can be used to control random access load.

Figure 12:
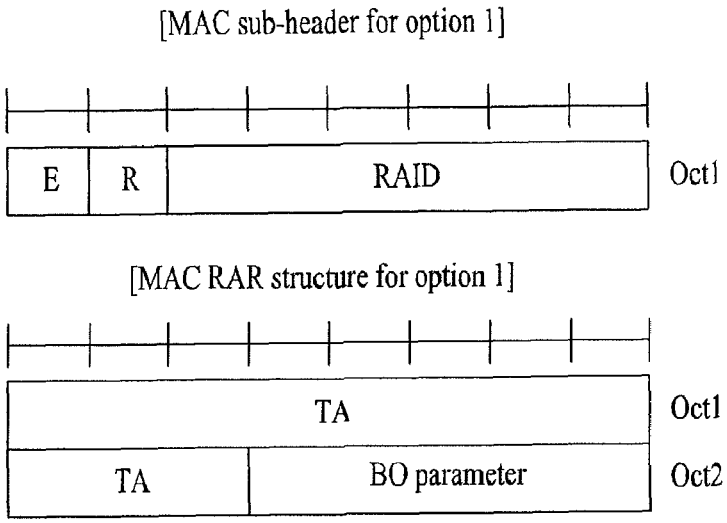
FIG. 12 illustrates a MAC sub-header and a MAC RAR structure when a MAC PDU includes an dedicated back-off (BO) parameter for each RAID according to an embodiment of the present invention.

FIG. 12 illustrates a MAC sub-header and a MAC RAR structure when a MAC PDU includes a dedicated back-off (BO) parameter for each RAID according to an embodiment of the present invention.

As shown in FIG. 12, the MAC sub-header has the same structure as the general E/R/RAID sub-header. That is, the MAC sub-header includes an E field, an R field, and a RAID field. On the other hand, a MAC RAR corresponding to the RAID includes a back-off parameter, unlike the general MAC RAR. Since the back-off parameter is provided for each RAID, a MAC RAR having a back-off parameter may also include a TA field. When a UE retransmits a random access preamble after performing back-off, the UE can control transmission timing of the random access preamble using a value included in the TA field of the MAC RAR. The MAC RAR may include only the back-off parameter although "TA" is illustrated as being additionally included in a MAC RAR having a back-off parameter in FIG. 12.

Option 2: Common Back-Off Information

A random access response message may include a back-off parameter commonly used by a plurality of UEs. In this case, the common back-off parameter in the random access response message is applied to UEs that have simultaneously accessed the random access response message using different RAIDs. In this regard, the following two sub-options can be considered.

Option 2a: Replacement of RAID with Back-Off Parameter

Figure 13:
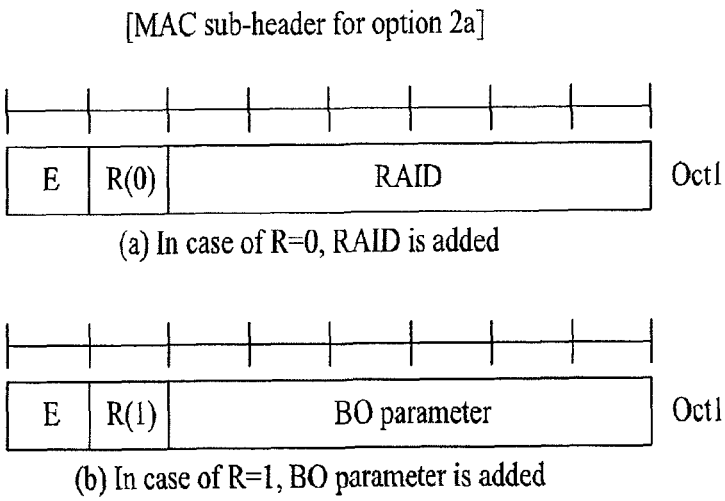
FIG. 13 illustrates a structure of a MAC sub-header including common back-off information according to an embodiment of the present invention.

FIG. 13 illustrates a structure of a MAC sub-header including common back-off information according to an embodiment of the present invention. As shown in FIG. 13, when an R bit in the E/R/RAID sub-header is set to "0", a normal RAID is included in the E/R/RAID sub-header (see FIG. 13(a)). On the other hand, when the R bit is set to "1", a back-off parameter is included in the RAID field (see FIG. 13(b)). Accordingly, when a UE confirmes that an R bit in a specific sub-header is set to "0", the UE assumes that a RAID field in the specific sub-header is a back-off parameter. This analysis of the R bit is illustrative and the R bit can be interpreted in the reverse manner.

For this reason, when a back-off parameter is included in a specific MAC sub-header, a RAID is not included in the specific MAC sub-header. On the other hand, when a RAID is included in a specific MAC sub-header, a back-off parameter is not included in the specific MAC sub-header. In FIG. 13, the R bit is illustrated as indicating whether or not a back-off parameter field is included in the MAC sub-header. However, FIG. 13 is only illustrative and whether or not the back-off parameter field is included in the MAC sub-header can be indicated by any field having a flag indicating the type of the back-off parameter field or indicating presence or absence of the back-off parameter field. For example, whether or not a back-off parameter field is included in a MAC sub-header can be indicated by an E field or an additional field included in the MAC sub-header. In this case, the size of the field indicating the type or presence of the back-off parameter field may be 1 bit.

The specific MAC sub-header including the back-off parameter may or may not correspond to a specific MAC RAR. The case where the specific MAC sub-header corresponds to a specific MAC RAR will be described later with reference to FIG. 14. In the case where the specific MAC sub-header does not correspond to a specific MAC RAR, a MAC PDU for a random access response may be constructed as follows.

(1) Include only a specific sub-header including back-off parameter

The random access response message may include only a specific MAC sub-header including a back-off parameter. In this case, the back-off parameter is applied to all UEs that receive the specific MAC sub-header. Accordingly, when a UE has received a random access response message including only one specific MAC sub-header including a back-off parameter, the UE obtains and stores the back-off parameter without the need to confirm whether or not a RAID of a preamble transmitted by the UE is included in the random access response message. In this case, a corresponding MAC RAR is not included in the random access response message. Accordingly, all UEs that have received the random access response message assume that random access has failed and perform back-off according to the back-off parameter.

(2) Additionally include normal sub-header without back-off parameter

The random access response message may include a sub-header including a back-off parameter and further include one or more normal sub-headers including no back-off parameter. The random access response message also includes normal MAC RARs corresponding respectively to the normal MAC sub-headers. The structures of the normal MAC sub-header and the normal MAC RAR are identical to those described above with reference to FIGS. 10 and 11. In this case, the back-off parameter is commonly applied to a plurality of UEs that receive the MAC sub-header. However, since the random access response message includes a MAC sub-header having a RAID and a corresponding MAC RAR, the scope of UEs to which the back-off parameter is applied is more restricted.

Specifically, when a UE has received a random access response message, the UE determines whether or not a RAID of the UE is included in a MAC header of the message. When the RAID of the UE is included in the MAC header, the UE can obtain information regarding uplink transmission timing, uplink radio resource allocation information for uplink SCH transmission, and temporary UE ID information from a corresponding MAC RAR. On the other hand, when the UE has failed to find a RAID of the UE in the MAC header, the UE obtains and stores a back-off parameter from a specific sub-header including the back-off parameter. In this case, it is assumed that the random access procedure has failed since the UE has failed to find a RAID of the UE in the random access response message. Accordingly, the UE performs back-off using the back-off parameter obtained from the specific sub-header. When the random access response message includes both the normal MAC sub-header and the specific MAC sub-header, the order of the two sub-headers is not limited. However, taking into consideration the fact that it is desirable that back-off be applied when the UE has failed to find a RAID of the UE, it is more preferable that the specific MAC sub-header having a back-off parameter be located at the end of the MAC header.

Figure 14:
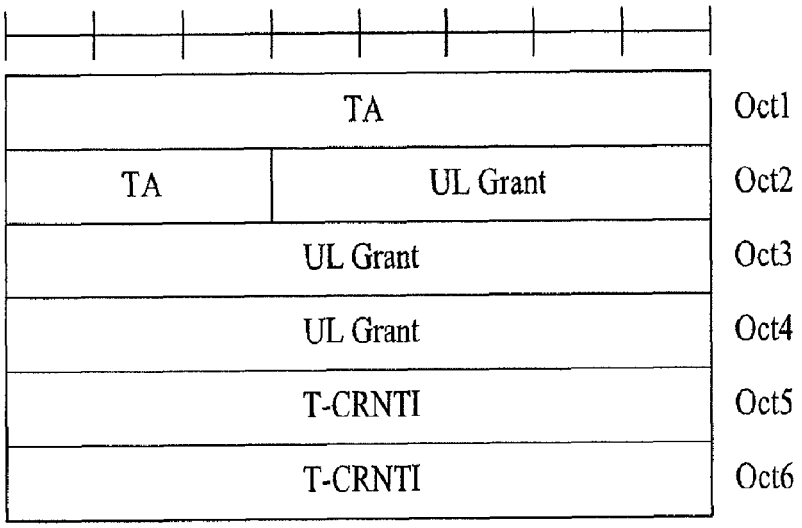
FIG. 14 illustrates a MAC RAR structure when a MAC sub-header includes common back-off information according to an embodiment of the present invention.
Figure 14:
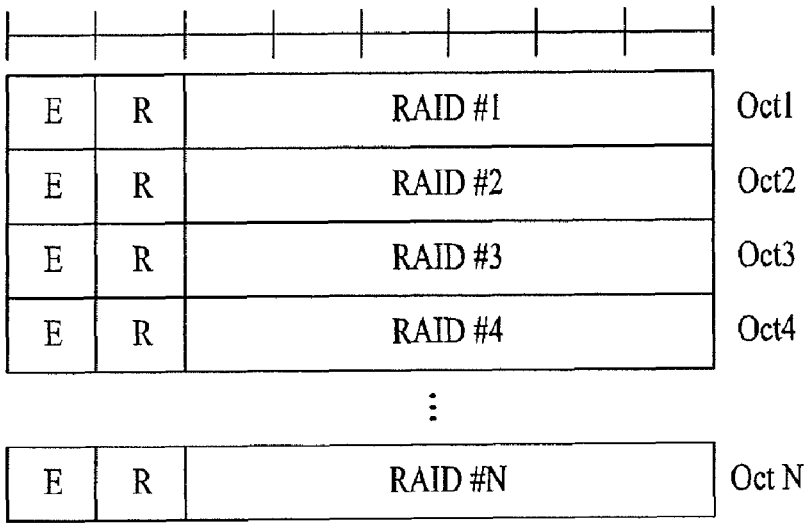

FIG. 14 illustrates a MAC RAR structure when a MAC sub-header includes common back-off information according to an embodiment of the present invention. As shown in FIG. 14, the structure of the MAC RAR is determined according to the type of the corresponding MAC sub-header. When the corresponding MAC sub-header includes a RAID (i.e., does not include a back-off parameter), the MAC RAR has a normal structure illustrated in FIG. 11 (see FIG. 14(a)). That is, the MAC RAR includes a Timing Advance (TA) field indicating uplink transmission timing, a UL grant field including uplink radio resource allocation information for uplink SCH transmission, and a T-CRNTI field that serves as a temporary UE identification.

As shown in FIG. 13, the random access response message in Option 2a may not include a MAC RAR corresponding to a MAC sub-header having a back-off parameter. However, the random access response message may further include a specific MAC RAR in order to more selectively control the scope of UEs to which the back-off parameter is applied. In this case, the specific MAC RAR may include UE information (e.g., a UE list) regarding one or more UEs to which the back-off parameter is applied. For example, the UE information may be a RAID for a random access preamble transmitted by a UE. Specifically, the specific MAC RAR may include a list of one or more different RAIDs. More specifically, a list of RAIDs in the specific MAC RAR may include an E field, an R field, and a RAID field. Here, the E field and the R field are identical to those described above with reference to the MAC E/R/RAID sub-header. By introducing a specific MAC RAR which corresponds to a MAC sub-header having a back-off parameter and includes a RAID list, the eNB can more selectively transmit a positive ACK to specific UEs and allow some other specific UEs to perform back-off.

Specifically, when a UE has received a random access response message, the UE determines whether or not a RAID of the UE is included in a MAC header of the message. When a RAID of the UE is included in a MAC header of the message, the UE can obtain information regarding uplink transmission timing, uplink radio resource allocation information for uplink SCH transmission, and temporary UE ID information from a corresponding MAC RAR. On the other hand, when the UE has failed to find a RAID of the UE in the MAC header but instead has found only a specific sub-header including a back-off parameter, the UE determines whether or not a specific MAC RAR corresponding to the specific MAC sub-header is present. When no specific MAC RAR is present, the UE performs back-off using the back-off parameter included in the specific MAC sub-header. On the other hand, when a specific MAC RAR is present, the UE determines whether or not a RAID of the UE is included in the specific MAC RAR. When the UE has found a RAID of the UE in the specific MAC RAR, the UE obtains a back-off parameter from the MAC sub-header. It is determined that the random access procedure has failed since the UE has not received a positive ACK although the UE has obtained the back-off parameter. Accordingly, the UE performs back-off using the back-off parameter. On the other hand, a UE, which has not found a RAID of the UE in the specific MAC RAR, performs back-off using a default back-off parameter or a back-off parameter obtained from a previous random access response message. The default back-off parameter includes 0 ms. The random access response message may include two or more MAC sub-headers having different back-off parameters and specific MAC RARs corresponding respectively to the MAC sub-headers. In this case, even when the back-off parameters have common back-off parameter characteristics, UEs that have transmitted different RAIDs can be configured to use different back-off parameters. Accordingly, the eNB can selectively apply different back-off parameters to different UEs.

When the random access response message includes both the normal MAC RAR and the specific MAC RAR, the order of the two MAC RARs is not limited. In this regard, it is more preferable that the specific MAC sub-header having a back-off parameter be located at the end of the MAC header as described above. Thus, it is also preferable that the specific MAC RAR be located last among the MAC RARs.

Figure 15:
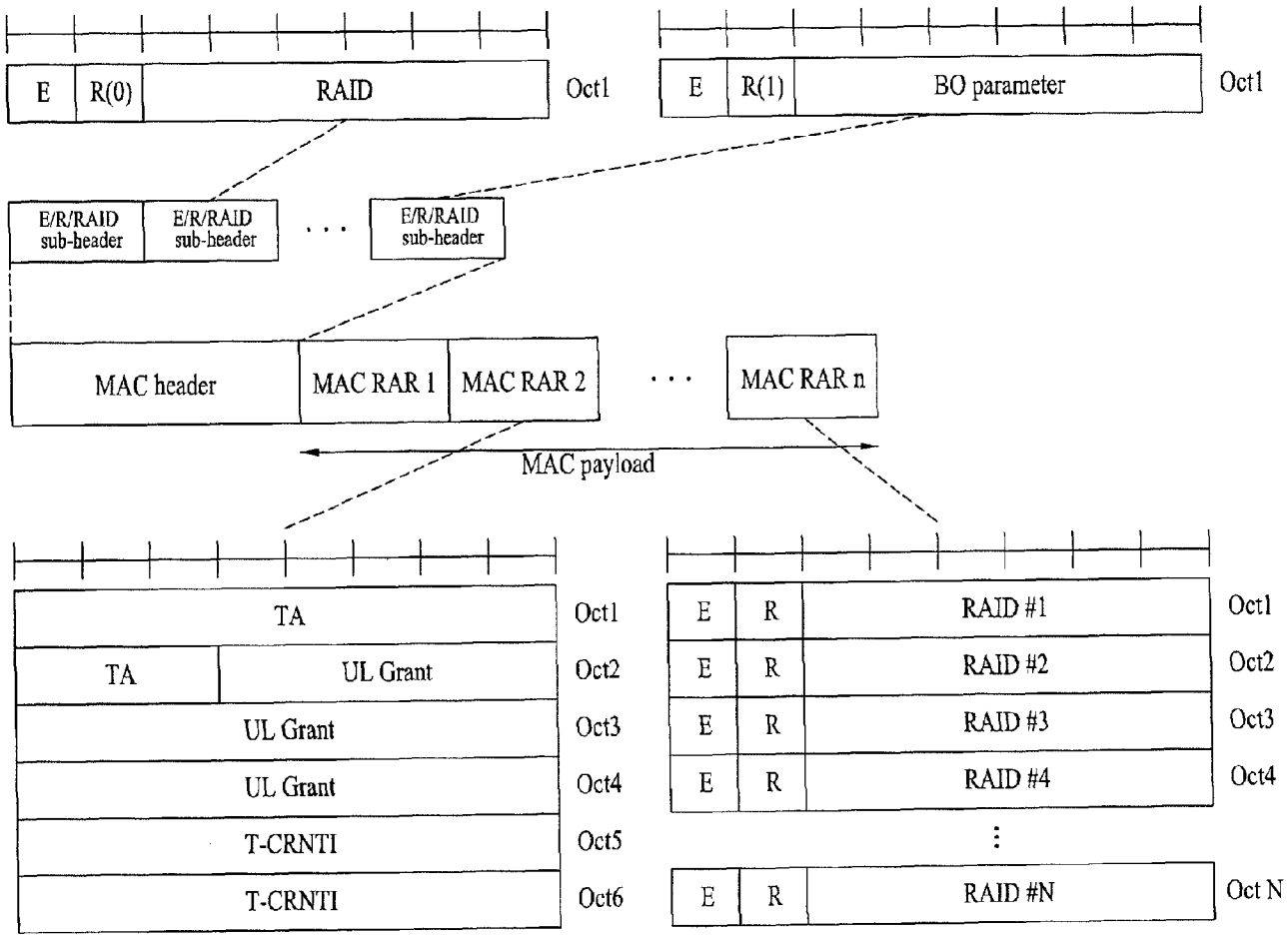
FIG. 15 illustrates a random access response message when back-off information is included in a MAC sub-header according to an embodiment of the present invention.

FIG. 15 illustrates a random access response message when back-off information is included in a MAC sub-header according to an embodiment of the present invention. The random access response message of FIG. 15 is a combination of the MAC sub-header structure of FIG. 13 and the MAC RAR structure of FIG. 14. The random access response message structure shown in FIG. 15 can be represented by the following table.

TABLE 2

| | MAC Header | MAC Payload |
|---|---|---|
| 1 | One 2nd MAC sub-header | — |
| 2 | One or more 1st MAC sub-headers[A] + One 2nd MAC sub-header[B] | One or more 1st MAC RARs[C] |
| 3 | One or more 1st MAC sub-headers + One 2nd MAC sub-header | One or more 1st MAC RARs + One 2nd MAC RAR[D] |
| 4 | One or more 1st MAC sub-headers + Two or more 2nd MAC sub-headers | One or more 1st MAC RARs + Two or more 2nd MAC RARs |

[A] Indicates a normal E/R/RAID sub-header (see FIG. 13A)
[B] Indicates a MAC sub-header including a back-off parameter (see FIG. 13(b))
[C] Indicates a normal MAC RAR corresponding to an E/R/RAID sub-header (see FIG. 14(a))
[D] Indicates a MAC RAR which corresponds to a MAC sub-header including a back-off parameter and includes a RAID list (see FIG. 14(b))

Option 2b: Special RAID for Common Back-Off Parameter

A certain RAID can be used only to indicate common back-off information. In this specification, the certain RAID is referred to as a "special RAID". The following is a detailed description thereof.

Figure 16:
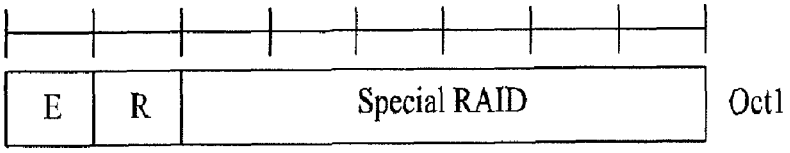
FIGS. 16 and 17 illustrate a MAC sub-header and a MAC RAR structure in the case where a special RAID is used according to an embodiment of the present invention.
Figure 17:
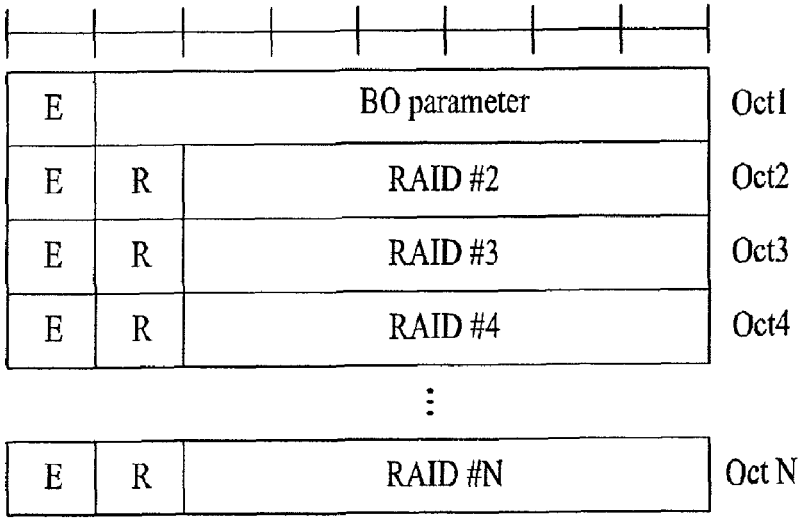

FIGS. 16 and 17 illustrate a MAC sub-header and a MAC RAR structure in the case where a special RAID is used according to an embodiment of the present invention. The MAC sub-header and the MAC RAR structure according to Option 2b are similar to those of Option 2a. The difference is that a special RAID rather than a back-off parameter is included in a MAC sub-header and a back-off parameter is included in a MAC RAR corresponding to the MAC sub-header. Although a list of RAIDs is illustrated as being additionally included in the MAC RAR, the MAC RAR may include only the back-off parameter. Other basic operations or features are similar to those of Option 2a.

Specifically, when a UE has received a random access response message, the UE determines whether or not a RAID of the UE is included in a MAC header of the message. When a RAID of the UE is included in a MAC header of the message, the UE can obtain information regarding uplink transmission timing, uplink radio resource allocation information for uplink SCH transmission, and temporary UE ID information from a corresponding MAC RAR. On the other hand, when the UE has failed to find a RAID of the UE in the MAC header but instead has found only a special RAID, the UE refers to a specific MAC RAR corresponding to a sub-header having the special RAID. When the specific MAC RAR includes a back-off parameter alone, all UEs which have referred to the specific MAC RAR perform back-off after obtaining the back-off parameter. On the other hand, when a list of RAIDs is included in the specific MAC RAR, the UE determines whether or not a RAID of the UE is included in the specific MAC RAR. When the UE has found a RAID of the UE in the specific MAC RAR, the UE obtains a back-off parameter from the MAC RAR and then performs back-off. On the other hand, a UE, which has not found a RAID of the UE in the specific MAC RAR, performs back-off using a default back-off parameter or a back-off parameter obtained from a previous random access response message. The default back-off parameter includes 0 ms. Accordingly, the eNB can selectively apply different back-off parameters to different UEs.

When the random access response message includes both the normal MAC RAR and the specific MAC RAR, the order of the two MAC RARs is not limited. However, taking into consideration the fact that it is desirable that back-off be applied when the UE has failed to find a RAID of the UE in the MAC sub-header, it is preferable that a sub-header having a special RAID and a corresponding specific MAC RAR be located last among the MAC RARs.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a terminal and a Base Station (BS). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPS), digital signal processing devices (DSPDS), programmable logic devices (PLDS), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

As is apparent from the above description, the embodiments of the present invention have the following advantages.

First, it is possible to reduce overhead and increase the efficiency of radio resources in association with a random access procedure performed in a wireless communication system.

Second, it is possible to signal back-off information only when random access is needed, thereby reducing overhead.

Third, it is possible to apply different back-off information to each UE in random access.

Fourth, it is possible to provide a message format for signaling back-off information in random access.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

The present invention can be applied to a wireless communication system, and more particularly, to a method for performing random access in a wireless communication system.

What is claimed is:

1. A method for performing a random access procedure in a wireless communication system, the method comprising:

transmitting a first preamble for random access from a mobile station to a network *node*;

receiving, by the mobile station, a random access response message from the network *node* as a response to the first preamble, the random access response message having [a MAC Medium Access Control header] *only one Medium Access Control* (*MAC*) *sub-header having a backoff parameter* and [zero or more] *not having any* MAC Random Access [Responses] *Response* (MAC [RARs] *RAR*);

determining [if] *that* a field in [a] *the* MAC sub-header [of the MAC header] indicates [a] *the* backoff parameter exists in the MAC sub-header;

obtaining the backoff parameter from the MAC sub-header [when] *based on determining that* the field in the MAC sub-header indicates the backoff parameter exists in the MAC sub-header; and performing backoff using the backoff parameter obtained from the MAC sub-header, wherein there is no [corresponding] MAC RAR *corresponding to the MAC sub-header that has the backoff parameter* in the random access response message[when the field in the MAC sub-header indicates the backoff parameter exists in the MAC sub-header].

2. The method of claim 1, wherein the field indicates whether or not the MAC sub-header has a random access preamble identifier or the backoff parameter.

3. The method of claim 1, wherein the backoff parameter is a common backoff parameter or an exclusive backoff parameter to be used exclusively by the mobile [terminal] *station*.

4. The method of claim 1, wherein the field is followed by the backoff parameter.

5. The method of claim 4, wherein the field is directly followed by the backoff parameter.

6. The method of claim 1, wherein the backoff parameter is related with a transmission of a second preamble for random access.

7. A method for performing a random access procedure in a wireless communication system, the method comprising:

receiving, at a network *node*, a first preamble for random access from a mobile [terminal] *station*;

transmitting, by the network *node*, a random access response message to the mobile [terminal] *station* as a response to the first preamble, the random access response message having [a MAC Medium Access Control header] *only one Medium Access Control* (*MAC*) *sub-header having a backoff parameter* and [zero or more] *not having any* MAC Random Access [Responses] *Response* (MAC [RARs] *RAR*), wherein [the MAC header comprises a] *the* MAC sub-header [including] *includes* a field indicating whether or not the MAC sub-header has a backoff parameter configured to enable the mobile [terminal] *station* to perform backoff;

determining, by the mobile [terminal] *station*, [if] *that* the field in the MAC sub-header indicates the backoff parameter exists in the MAC sub-header;

obtaining, by the mobile [terminal] *station*, the backoff parameter from the MAC sub-header [when] *based on determining that* the field in the MAC sub-header indicates the backoff parameter exists in the MAC sub-header; and performing, by the mobile [terminal] *station*, *the* backoff using the backoff parameter obtained from the MAC sub-header, wherein there is no [corresponding] MAC RAR *corresponding to the MAC sub-header that has the backoff parameter* in the random access response message[when the field in the MAC sub-header indicates the backoff parameter exists in the MAC sub-header].

8. The method of claim 7, wherein the field indicates whether or not the MAC sub-header has a random access preamble identifier or the backoff parameter.

9. The method of claim 7, wherein the backoff parameter is common [back-off] *backoff* parameter or an exclusive backoff parameter to be used exclusively by the mobile [terminal] *station*.

10. The method of claim 7, wherein the field is followed by the backoff parameter.

11. The method of claim 10, wherein the field is directly followed by the backoff parameter.

12. The method of claim 7, wherein the backoff parameter is related with a transmission of a second preamble for random access that is to be received by the network *node*.

13. A mobile [terminal] *station* configured to perform a random access procedure in a wireless communication system, *the mobile station* comprising:

a processor configured to cause the mobile [terminal] *station* to*:* transmit a first preamble for random access to a network *node*;

process a random access response message received from the network *node* as a response to the first preamble, the random access response message having [a MAC Medium Access Control header] *only one Medium Access Control* (*MAC*) *sub-header having a backoff parameter* and [zero or more] *not having any* MAC Random Access [Responses] *Response* (MAC [RARs] *RAR*);

determine [if] *that* a field in [a] *the* MAC sub-header [of the MAC header] indicates [a] *the* backoff parameter exists in the MAC sub-header;

obtain the backoff parameter from the MAC sub-header [when] *based on determining that* the field in the MAC sub-header indicates the backoff parameter exists in the MAC sub-header; and perform backoff using the backoff parameter obtained from the MAC sub-header, wherein there is no [corresponding] MAC RAR *corresponding to the MAC sub-header that has the backoff parameter* in the random access response message[when the field in the MAC sub-header indicates the backoff parameter exists in the MAC sub-header].

14. The mobile [terminal] *station* of claim 13, wherein the field indicates whether or not the MAC sub-header has a random access preamble identifier or the backoff parameter.

15. The mobile [terminal] *station* of claim 13, wherein the backoff parameter is a common backoff parameter or an exclusive backoff parameter to be used exclusively by the mobile [terminal] *station*.

16. The mobile [terminal] *station* of claim 13, wherein the field is followed by the backoff parameter.

17. The mobile [terminal] *station* of claim 16, wherein the field is directly followed by the backoff parameter.

18. The mobile [terminal] *station* of claim 13, wherein the backoff parameter is related with a transmission of a second preamble for random access.

19. A network *node* configured to perform a random access procedure in a wireless communication system, *the network node* comprising:

a processor configured to cause the network *node* to process a first preamble for random access received from a mobile [terminal] *station*; and to transmit a random access response message to the mobile [terminal] *station* as a response to the first preamble, the random access response message having [a MAC Medium Access Control header] *only one Medium Access Control* (*MAC*) *sub-header* and [zero or more] *not having any* MAC Random Access [Responses] *Response* (MAC [RARs] *RAR*), wherein [the MAC header includes a] *the* MAC sub-header [including] *includes* a field indicating whether or not the MAC sub-header includes a backoff parameter, and wherein there is no [corresponding] MAC RAR *corresponding to the MAC sub-header that has the backoff parameter* in the random access response message[when the field in the MAC sub-header indicates the backoff parameter exists in the MAC sub-header].

20. The network *node* of claim 19, wherein the field indicates whether or not the MAC sub-header has a random access preamble identifier or the backoff parameter.

21. The network *node* of claim 19, wherein the backoff [information] *parameter* is a common backoff parameter or an exclusive backoff parameter to be used exclusively by the mobile [terminal] *station*.

22. The network *node* of claim 19, wherein the field is followed by the backoff parameter.

23. The network *node* of claim 22, wherein the field is directly followed by the [back-off] *backoff* parameter.

24. The method *node* of claim 19, wherein the backoff parameter is related with a transmission of a second preamble for random access that is to be received by the network *node*.

* * * * *